Jan. 29, 1957   F. M. WEITZEL   2,779,606
WEIGHT SHIFTER AND BALANCING DEVICE OR HITCH
Filed June 13, 1955
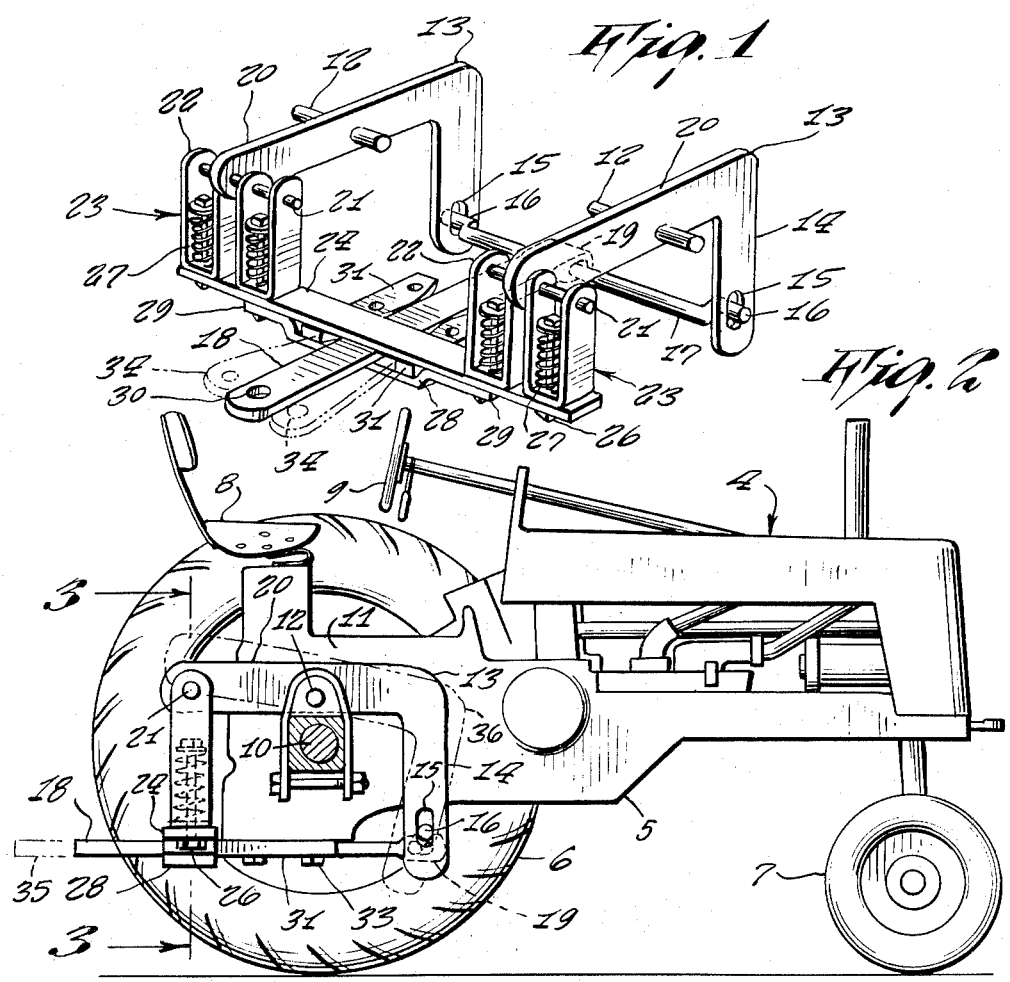
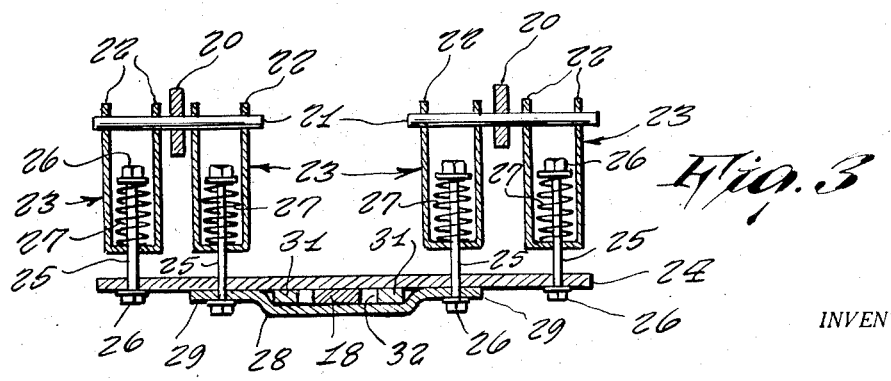
INVENTOR.

United States Patent Office 2,779,606
Patented Jan. 29, 1957

2,779,606

WEIGHT SHIFTER AND BALANCING DEVICE OR HITCH

Fred M. Weitzel, Hillpoint, Wis.

Application June 13, 1955, Serial No. 515,002

7 Claims. (Cl. 280—489)

This invention relates to hitches for motor driven vehicles and the like, and particularly to what I choose to term a weight shifter or balancing device or hitch.

The main object of my invention is to provide a self-propelled vehicle with a special type of hitch capable of shifting the weight or balance of the load pulled by the vehicle.

An ancillary object of the invention is to have such a weight shifting device or hitch that eliminates shocks and sudden strains from the hitch and the vehicle doing the pulling.

Another object of this invention is to introduce a flexibility of operation to a vehicle pulling a load by means of the invention so as to allow a change in the center of gravity of the point where the main strains occur during the pulling of the load and thereby introducing, as it were an automatic self-adjustment of the vehicle and the load for the most effective operation.

It is also a practical object of my invention to produce such a special balancing hitch that may be installed on any existing self-propelled vehicles such as tractors and trucks, etc.

It is even an object, withal to have such a hitch or weight shifting device that is reasonable in cost, easy to install, and virtually automatic in operation so as to require substantially no attention when once attached, and also light in weight to avoid introducing any difficulties into pulling loads by motor vehicles.

Other objects and advantages of my invention will appear in greater detail as the specification proceeds.

In order to facilitate ready comprehension of this invention for a proper appreciation of the salient features thereof, the invention is illustrated on the accompanying drawing forming part hereof, and in which:

Figure 1 is a perspective view of a weight shifter and balancing device or hitch made according to my invention and embodying the same in a practical form;

Figure 2 is a side elevation of tractor with a portion removed to reveal detail and having the weight shifter or balancing device of Figure 1 installed in operative position; and Figure 3 is a vertical section of the device as taken on line 3—3 in Figure 2.

In these views, the same reference numerals indicate the same or like parts and features.

When tractors and trucks are used to haul and pull various loads such as carts and the like, they are often subject to sudden and severe strains and especially does the load often suffer disarrangement, and the cart or similar pulled load vehicle may be subject to tipping and overturning or other misadventures, because abrupt pulls on the load by the tractor or truck occasioned by inequalities of the terrain over which it may be driven. The trouble is primarily that the hitch is ordinarily unyielding and directly attached, and naturally there is no provision for readjusting the pull on the load or allowing for irregular pulling of this load from rough driving.

Upon considering this problem, it has occurred to me that if a special hitch would be mounted on the tractor or truck doing the pulling which would take up jolts and jerks in the pull of the truck or tractor and would also change the strain level accordingly, the operation of pulling a load over rough terrain would be reduced to a simple matter that would occasion no trouble whatever. As a result of such consideration, I have succeeded in producing a special weight shifting device or balancing hitch along the lines already mentioned, which will now be described in detail in the following.

Hence, in the practice of my invention, and referring also again to the drawing, with particular reference to Figure 2 thereof, the tractor, trailer cab or truck generally indicated at 4 has the frame 5 with rear draft wheels 6 (one shown) front wheel 7 and seat 8 as well as steering wheel 9. The engine and its drive to the wheels may be conventional, but the hitch for a trailer or load is preferably connected above the rear wheel axle 10, as will be further explained. The two sides 11, 11 of frame 5 of the tractor have two fulcrum pins or shafts 12, 12 extending horizontally through them in alinement to pivotally support the two hitch brackets 13, 13 in spaced apart relation which are each L-shaped with a depending front leg 14 upon each extending down at each side of the tractor frame 5 with a short vertical slot 15 in the lower end of each leg, as noted in Figures 1 and 2. Into these slots extend the eccentric ends of a shaft 17 at 16, 16, this shaft serving as an anchor member for a hitch or draft bar 18 through the rear end of which this shaft extends at 19.

The forward ends of the upper horizontal arms 20, 20 of the parallel brackets have further horizontal pivot shafts or pins 21, 21 pivotally connected to and supporting the upper ends 22, 22 of two pairs of spring cradles or yokes 23, 23, etc., which are disposed at their lower ends over a cross bar 24. This cross bar is suspended beneath yokes 23 by means of a plurality of vertical bolts 25, 25, etc., that extend slidably through the lower ends of these yokes and down through the same cross bar with heads or nuts 26, 26 upon both ends of the bolts to retain the parts in assembled condition. Beneath the heads or nuts 26 on the upper ends of the bolts are located compression springs 27, 27, with one spring mounted about each bolt and resting with its lower end upon the bottom of one spring yoke or cradle 23 in each case. The bolts thus are supported resiliently by the springs while cross bar 24 is supported by the lower ends of the same bolts and thus by the springs as a group.

Upon this cross bar is fixed a longitudinal yoke or spaced bar 28, preferably beneath it and having the ends offset upwardly at 29, 29 to present an intermediate slot or space between the intermediate portion of this bar and cross bar 24 to accommodate draw or hitch bar 18 that projects therethrough and has the projecting end provided with a connecting hole 30 for receiving a bolt or hook from the load or trailer to be pulled. The slot is sufficiently wide to receive a pair of side limit bars 31, 31 at 32 that are secured beneath the frame 5 by screws or bolts 33 and allow limited lateral shifting of the hitch bar 18 as indicated at 34, 34 in broken lines.

It will thus be seen that the hitch device is connected to the tractor frame at two points, namely, at the pivoting fulcrum formed by alined pivot shafts 12 and by the two limit bars 31 beneath the frame extending into the space 32 between the crossbar 24 and the yoke bar 28 secured to it. When the hitch bar 18 is attached by its end hole 30 to a load such as a cart or trailer, etc., and the tractor started, naturally, the trailing load will drag on this bar and tend to pull it back as indicated in Figure 2 at 35 and will tend to partly rotate the whole device into the position indicated at 36, which movement immediately draws the spring yokes 23 upward and compresses springs 27 that resiliently tend to oppose such compression, inasmuch as the cross bar 24 is held down at its original level by the two limit bars 31, 31 which are secured beneath the tractor frame 5.

However, in view of the fact that the front end 19 of hitch bar 18 is connected to eccentric shaft 17 with the offset ends 16 of the latter located in the slots 15 of depending legs 14 of the brackets 13, there is leeway for the brackets to swivel on shafts 12 and still allow the hitch bar to maintain draft connection with the balancing brackets and the device as a whole that is effective to pull the trailer or other load connected to bar 18. The rocking of the brackets against the resilient resistance of springs 27 tends to alter the level or line of strain through the tractor and the load, while obviously eliminating shocks or sudden forward or backward jerks and jolts from both. As the trailer or other load offers less resistance to the tractor because the ground becomes plausibly even, the brackets 13 will tend less to rock about their pivot mountings 12 and the load level or strain lowers through the tractor-load couple while causing a smooth pull to be effective throughout.

Manifestly, variations may be resorted to, and parts and features may be modified or used without others within the scope of the appended claims.

Having now fully described my invention, I claim:

1. A weight shifter, balancing device, and hitch of the character described, including a rocking bracket member pivotally mounted upon a portion of the frame of a tractor adapted to pull a load, at least one spring yoke connected to a portion of the rocking bracket spaced a distance rearwardly from the pivot mounting of the latter, a spring in the spring yoke having a bolt extending through the spring and slidably through the lower portion of the yoke with the bolt resiliently supported upon tne upper end of the spring, a stationary member connected to a relatively lower portion of said tractor frame, the lower end of the bolt extending slidably through the same with a stop on the bottom of the bolt to retain said bolt in place, a hitch bar disposed longitudinally of the tractor in close association with said stationary member and projecting beyond the same into accessible position for attachment to the load, means for retaining the hitch bar slidably in contact with said stationary member, and a transverse member connected to a portion of said rocking bracket remote from the end connected to the spring yoke, said transverse member also being connected to the opposite end of said hitch bar.

2. A device or hitch according to claim 1, wherein there are two rocking brackets and both are similarly pivotally mounted, and each is provided with spring yokes and springs.

3. A device according to claim 2, wherein the brackets in each case include a substantially horizontal arm and a depending leg on one end, and the transverse member is an eccentric shaft, the lower ends of said legs having slots into which the ends of said eccentric shaft extend while the intermediate portion of the shaft extends rotatably through the end of the hitch bar.

4. A device according to claim 3, wherein the spring yokes are connected to the ends of the brackets opposite to the depending legs, and the pivot mountings for said brackets are located intermediate of said ends of the brackets and said depending legs.

5. A device according to claim 4, wherein the transverse eccentric shaft has the ends eccentrically offset with respet to the intermediate portion that extends through the end of the hitch bar.

6. A device according to claim 5, wherein the means retaining the hitch bar in contact with the stationary member is a bar having the ends thereof offset and secured to said stationary member to provide an intermediate slot or space between the two for receiving the hitch bar therebetween, and wherein the stationary member per se includes a transverse cross bar suspended from the springs in the spring yokes.

7. A device according to claim 6, wherein there are two limit side bars secured beneath the tractor frame which extend longitudinally into the slot between the cross bar and the bar secured at its offset ends thereto at both sides of the hitch bar whereby the hitch bar to shift laterally in limited manner in the slot.

References Cited in the file of this patent

UNITED STATES PATENTS

| | | |
|---|---|---|
| 2,451,054 | Atkinson | Oct. 12, 1948 |
| 2,463,140 | Bihn | Mar. 1, 1949 |
| 2,702,198 | Gaines | Feb. 15, 1955 |